(12) United States Patent
Sappey et al.

(10) Patent No.: US 6,400,509 B1
(45) Date of Patent: Jun. 4, 2002

(54) APPARATUS AND METHOD FOR THE REDUCTION OF POLARIZATION SENSITIVITY IN DIFFRACTION GRATINGS USED IN FIBER OPTIC COMMUNICATIONS DEVICES

(75) Inventors: Andrew D. Sappey, Lakewood; Bernhard W. Bach, Boulder, both of CO (US)

(73) Assignee: Zolo Technologies, Inc., Louisville, CO (US)

( * ) Notice: Subject to any disclaimer, the term of this patent is extended or adjusted under 35 U.S.C. 154(b) by 0 days.

(21) Appl. No.: 09/675,768

(22) Filed: Sep. 29, 2000

Related U.S. Application Data

(60) Provisional application No. 60/195,390, filed on Apr. 7, 2000.

(51) Int. Cl.[7] .................................................. G02B 5/18
(52) U.S. Cl. ..................... 359/571; 359/569; 359/572; 359/574; 359/576; 359/130; 359/900
(58) Field of Search ....................... 385/24, 37; 359/130, 359/576, 572, 571, 569, 566, 575, 900

(56) References Cited

U.S. PATENT DOCUMENTS

| | | | |
|---|---|---|---|
| 3,237,508 A | * | 3/1966 | Keller et al. ................. 359/571 |
| 4,153,330 A | | 5/1979 | Tomlinson, III |
| 4,330,175 A | * | 5/1982 | Fujii et al. ................... 359/571 |
| 4,736,360 A | | 4/1988 | McMahon |
| 4,741,588 A | | 5/1988 | Nicia et al. |
| 5,080,465 A | * | 1/1992 | Laude ......................... 359/571 |
| 5,625,723 A | | 4/1997 | Dragone |
| 5,748,350 A | | 5/1998 | Pan et al. |
| 5,809,184 A | | 9/1998 | Doerr et al. |
| 5,835,643 A | | 11/1998 | Fukumoto et al. |
| 5,926,497 A | | 7/1999 | Nitta et al. |
| 5,926,593 A | | 7/1999 | Asami et al. |
| 5,937,113 A | | 8/1999 | He et al. |
| 5,949,925 A | | 9/1999 | Seino |
| 5,966,483 A | | 10/1999 | Chowdhury |
| 5,974,206 A | | 10/1999 | Bircheno et al. |
| 5,982,960 A | | 11/1999 | Akiba et al. |
| 6,038,357 A | | 3/2000 | Pan |
| 6,084,695 A | | 7/2000 | Martin et al. |
| 6,097,863 A | | 8/2000 | Chowdhury |

FOREIGN PATENT DOCUMENTS

| | | | | |
|---|---|---|---|---|
| JP | 62-047005 A | * | 2/1987 | .................. 359/130 |
| WO | WO 99/41858 | | 8/1999 | |

OTHER PUBLICATIONS

Engman et al., (1983) Physica Scripta, 28:86–88.
Graf et al., (Jan. 1994) Applied Optics, 33:96–102.

* cited by examiner

Primary Examiner—Cassandra Spyrou
Assistant Examiner—John Juba, Jr.
(74) Attorney, Agent, or Firm—Swanson & Bratschun LLC

(57) ABSTRACT

A diffraction grating for use in multiplexing and demultiplexing optical signals in optical communication systems having reduced polarization sensitivity has a plurality of grooves including reflective step surfaces and transverse riser surfaces separated by a flat. The step surfaces have a reflective coating and the riser surfaces do not have a reflective coating. A method of making a reflective diffraction grating includes forming a plurality of grooves in a substrate, the grooves having a step surface for reflecting an incident beam, a transverse riser and a flat therebetween and providing a reflective coating on the steps and not on the risers.

17 Claims, 4 Drawing Sheets

APPARATUS AND METHOD FOR THE REDUCTION OF POLARIZATION SENSITIVITY IN DIFFRACTION GRATINGS USED IN FIBER OPTIC COMMUNICATIONS DEVICES

RELATED APPLICATIONS

This application claims priority from United states Provisional Application Ser. No. 60/195,390, filed on Apr. 7, 2000, entitled "Apparatus and Method for the Reduction of Polarization Dependent Loss in Fiber Optic Devices Employing Diffraction Gratings", the contents of which are incorporated herein in their entirety.

TECHNICAL FIELD

The present invention is directed toward optical communications, and more particularly toward reduction of polarization sensitivity in optical multiplexers/demultiplexers using bulk diffraction gratings.

BACKGROUND ART

At the inception of fiber optic communications, typically a fiber was used to carry a single channel of data at a single wavelength. Dense wavelength division multiplexing (DWDM) enables multiple channels at distinct wavelengths within a given wavelength band to be sent over a single mode fiber, thus greatly expanding the volume of data that can be transmitted per optical fiber. The wavelength of each channel is selected so that the channels do not interfere with each other and the transmission losses to the fiber are minimized. Typical DWDM allows up to 40 channels to be simultaneously transmitted by a fiber.

DWDM requires two conceptually symmetric devices: a multiplexer and a demultiplexer. A multiplexer takes multiple beams or channels of light, each at a discrete wavelength and from a discrete source and combines the channels into a single multi-channel or polychromatic beam. The input typically is a linear array of waveguides such as a linear array of optical fibers, a linear array of laser diodes or some other optical source. The output is typically a single waveguide such as an optical fiber. A demultiplexer specially separates a polychromatic beam into separate channels according to wavelength. Input is typically a single input fiber and the output is typically a linear array of waveguides such as optical fibers or a linear array of photodetectors.

In order to meet the requirements of DWDM, multiplexers and demultiplexers require certain inherent features. First, dispersive devices must be able to provide for a high angular dispersion of closely spaced channels so that individual channels from a multi-channel or multiplexed beam can be separated sufficiently over relatively short distances to couple with a linear array of single channel fibers. Multiplexers and demultiplexers are preferably reversible so that a single device can perform both multiplexing and demultiplexing functions (hereinafter, a "(de)multiplexer"). Furthermore, the (de)multiplexer must be able to accommodate channels over a free spectral range commensurate with fiber optic communications bandwidth. Moreover, the devices must provide high resolution to minimize cross talk and must further be highly efficient to minimize signal loss. The ideal device would also be small, durable, inexpensive, and scalable.

Diffraction grating based multiplexers and demultiplexers have significant advantages over other technologies for dense wavelength division multiplexing applications because of their relatively low cost, high yield, low insertion loss and cross talk, uniformity of loss as well as their ability to multiplex a large number of channels concurrently. Representative diffraction grating based (de)multiplexer configurations are disclosed on applicant's commonly assigned co-pending U.S. patent application Ser. No. 09/628,774, filed Jul. 29, 2000, entitled "Echelle Grating Dense Wavelength Division Multiplexer/Demultiplexer", the contacts of which are incorporated herein in their entirety. However, diffraction gratings have an intrinsic polarization sensitivity that can limit their usefulness in (de)multiplexing applications. That is, an optical signal propagating through an optical fiber has an indeterminate polarization state, requiring that the (de)multiplexer be substantially polarization insensitive so as to minimize polarization dependent losses, a measure of diffraction efficiency that is dependent on the polarization state of the optical signal.

There are numerous methods and apparatus for reducing the polarization sensitivity of diffraction grating fiber optic (de)multiplexers. Chowdhury, U.S. Pat. Nos. 5,966,483 and 6,097,863 (collectively "Chowdhury"), the disclosure of which is incorporated in its entirely by reference, describes a diffraction grating with reduced polarization sensitivity. Chowdhury teaches that polarization sensitivity can be minimized by orienting the reflective faces of a diffraction grating at a blaze angle "$\theta_b$" for retro-reflecting normal incident light of a wavelength "$\lambda_b$" that is different from a median wavelength "$\lambda_o$" of a transmission bandwidth "$\Delta\lambda$". The blaze angle $\theta_b$ is chosen to reduce the difference between first and second diffraction efficiencies of a wavelength $\lambda$ within the transmission bandwidth $\Delta\lambda$. This solution for minimizing differences in diffraction efficiency can be of limited utility because it requires limitations on election of blaze angles and blaze wavelengths that can inhibit the overriding goal of providing a diffraction grating for a (de)multiplexer accommodating a large number of closely spaced channels with high resolution, minimal cross talk and little signal loss.

Chowdhury further teaches that diffraction grating polarization sensitivity can be reduced by providing concave and convex corners between adjacent reflective steps and risers of a diffraction grating. More particularly, Chowdhury teaches that polarization sensitivity can be reduced by varying the radius of concave corners between adjacent steps and risers. While this proposal has the advantage of not placing an unwarranted restraint of selection of a blaze wavelength and blaze angle for a grating, accurately controlling the concave and convex radii on a nanometer scale could be both difficult and expensive. It can also limit the absolute efficiency of the grating.

Chowdhury also teaches that maximizing the pitch (or groove spacing) can help to minimize polarization sensitivity. However, as with Chowdhury's proposal of manipulating blaze angle and blaze wavelength to minimize polarization sensitivity, this proposal puts constraints on grating pitch that can degrade other important objectives of the diffraction grating, such as achieving suitable channel separation for DWDM signals.

McMahon, U.S. Pat. No. 4,736,360, teaches that polarization sensitivity in a bulk optic grating can be minimized by assuring that the width of the reflective surface is sufficiently large as compared to the operating wavelength of the grating. This is effectively similar to maximizing pitch as taught by Chowdhury. While this solution may have limited application, it also places what can be an unnecessary restraint on grating design choices and thus may limit the ability of the grating to perform its wavelength division (de)multiplexing function for signals having a close channel spacing.

He, U.S. Pat. No. 5,937,113, teaches yet another way to minimize polarization dependent losses for an optical waveguide diffraction grating. He teaches a diffraction grating device having an output region with a plurality of predetermined light receiving locations, A first slab waveguide region has a first birefringence, the first slab guide region being optically coupled with input and output regions of the device. A second slab waveguide region adjacent to the first slab waveguide region has a predetermined shape and predetermined dimensions providing a second different birefringence than the first slab waveguide region to provide polarization compensation for the device. This solution requires providing first and second slab waveguides and thus is not readily applicable to bulk optic devices. In any event, providing at least two slab waveguides increases product complexity and cost.

Another known method for reducing polarization sensitivity is providing a polarization separator followed by a half wave plate on one of the separated beams between a collimating optic and a grating. The polarization separator splits an incident beam into first and second beams of light, with each beam being linearly polarized along different orthogonal directions. The half wave plate located on one of the beams results in both beams having the same orthogonal polarization. While this method has the advantage of not placing limitations on the design of the diffraction grating so as to limit its utility for performing DWDM, both the polarization beam splitter and the half wave plate tend to degrade the overall efficiency of the (de)multiplexer and add to part count and device complexity. The use of a polarization beam splitter for minimizing polarization sensitivity is taught in Nicia, U.S. Pat. No. 4,741,588; Martin, U.S. Pat. No. 6,084,695; Doerr, U.S. Pat. No. 5,809,184; and Boord, WO 99/41858.

The present invention is intended for overcoming one or more of the problems discussed above.

SUMMARY OF THE INVENTION

A first aspect of the present invention is a diffraction grating for multiplexing and demultiplexing optical signals in an optical communication system. The diffraction grating has a plurality of grooves formed in a substrate, with each groove having a groove surface including a reflective step surface. The reflective step surfaces have a reflective coating and the remainder of the groove surfaces do not have a reflective coating. The groove surfaces may further include a transverse riser between reflective step surfaces of adjacent grooves. The reflective coating may be an electrically conductive metallic coating, preferably consisting of gold.

Another aspect of the present invention is a method of making a reflective diffraction grating for diffracting optical signals in an optical communications system. The method includes forming a plurality of parallel grooves in a substrate, the parallel grooves comprising steps and transverse risers. A reflective coating is provided on the steps and not on the risers. The reflective coating may be applied to the grooves, excluding the risers, by ion beam sputtering or the reflective coating may be applied to both the steps and the risers and then etched from the risers. The reflective coating may be an electrically conductive metallic coating, preferably gold.

The apparatus and method for reducing the polarization sensitivity of diffraction gratings in accordance with the present invention allows the blaze angle and groove spacing of the grating to be chosen to optimize such things as angular dispersion, overall efficiency and resolution for dense channel spacing (0.4 nm or less) over a relatively wide bandwidth. Polarization insensitivity is then provided by providing a reflective conductive coating on the reflective steps of the diffraction grating and not on the risers. The present invention allows for the minimization of polarization sensitivity without introducing additional components or complexity into a multiplexer/demultiplexer utilizing a diffraction grating and without materially limiting grating design choices. The modifications to the diffraction grating necessary to practice the present invention are both minor and inexpensive, having essentially no effect on the cost or complexity of the grating itself.

DETAILED DESCRIPTION OF THE PREFERRED EMBODIMENT

Figure 1:
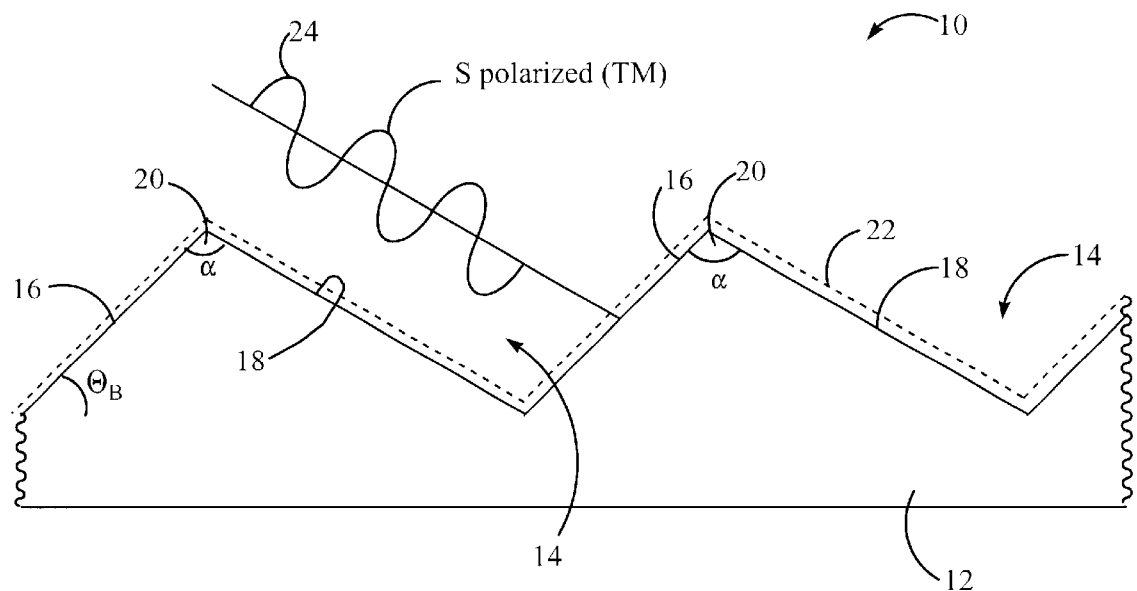
FIG. 1 is a schematic profile of the groove pattern of a prior art diffraction grating.

FIG. 1 is the schematic profile of the groove pattern of a prior art diffraction grating 10. Grating 10 consists of a substrate 12 having a plurality of grooves 14 formed therein. The grooves are defined by adjacent transverse, planar steps 16 and risers 18. Adjacent steps and risers have an apex 20 directed away from the substrate with a select angle (a) between the adjacent steps and risers 16, 18. As illustrated in FIG. 1, both the steps and the risers are coated with a conductive reflective coating, typically a metallic reflective coating 22 such as gold.

Figure 2:
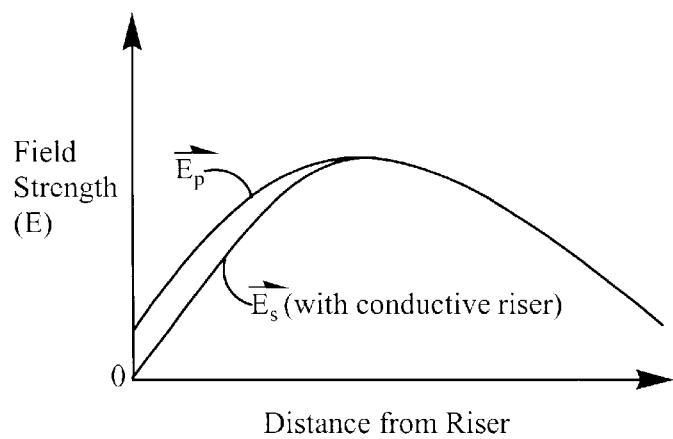
FIG. 2 is a graphical representation of the field strength of s polarized and p polarized light refracted from the reflective surfaces of the grating steps of FIG. 1 as a function of distance from the riser.

A sine wave 24 is drawn in FIG. 1 to represent the oscillating electric field of (s) polarized light in the "TM" (transverse magnetic) direction of polarization. This electric field oscillates in a plane perpendicular to the grating grooves and perpendicular to the plane of riser 18. The orthogonal oscillating reflective field of (p) polarized light or the "TE" (transverse electric) direction of polarization oscillates parallel to the grating grooves. It is known that the diffraction efficiency for the TE and TM components of the diffracted light are different in diffraction gratings. While there is no intention to limit the scope of this disclosure or the appended claims by this statement of theory, one at least partial explanation for the different diffraction efficiency of the orthogonal components of polarized light is that the conductive coating on the riser surface interferes with the electric field. This phenomenon is illustrated graphically in FIG. 2. FIG. 2 is a representation of field strength on the Y axis versus distance from the riser on the X axis. The field strength $E_s$ at the riser is zero. In contrast, the electric field vector of the (p) polarized light, which is parallel to the grating rulings and perpendicular to the plane of the (s) polarized light, does not sample the region near the grating riser. Thus, there are minimal boundary conditions imposed by the grating riser and at the riser $E_p \neq 0$. It is the change in boundary conditions that is believed to be one factor increasing the polarization dependence of the grating.

Figure 3:
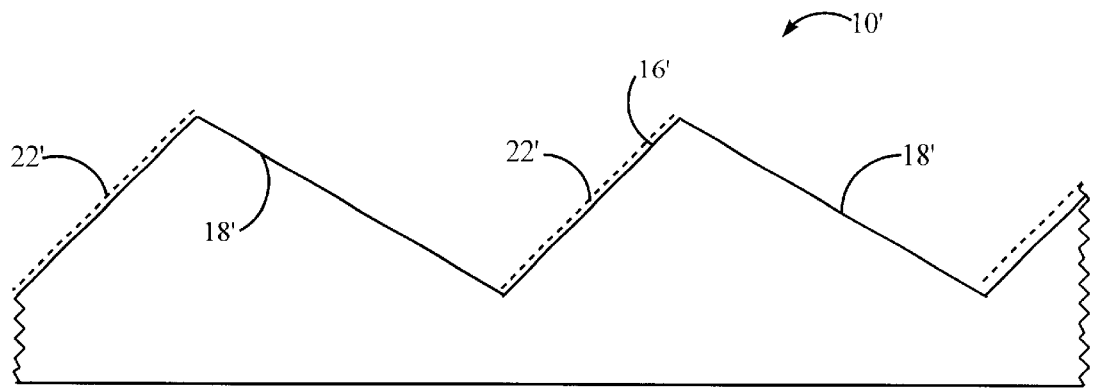
FIG. 3 is a schematic profile of the groove pattern of the diffraction grating of FIG. 1 with only the steps having a conductive reflective coating in accordance with the present invention.

FIG. 3 illustrates a modification to the grating 10 of FIG. 1 for minimizing polarization dependent loss of the grating. The grating 10' has a reflective coating 22' on the reflective steps 16' only, and no reflective coating on the risers 18'. This eliminates the boundary condition imposed by the conductive coating on the grating riser as illustrated in FIG. 2, and for that reason is believed to decrease polarization dependent loss.

The gratings disclosed herein may be formed from one of several known methods. For example, it may be formed from an epoxy layer deposited on a glass substrate into which a master die defining the grooves is pressed. The grooves may also be precision machined directly into a glass or silicon substrate by an interferometrically controlled ruling engine. A further option is the use of photolithographic techniques described in McMahon, U.S. Pat. No. 4,736,360, the contents of which are hereby expressly incorporated by reference in its entirety.

Coating of only the steps can be accomplished using coating techniques that employ a highly directional beam of reflective coating material (e.g., ion beam sputtering) or by coating the entire grating surface with the reflective coating using known techniques and ion etching the coating from the risers. The reflective coating may be any suitably reflective material, and is typically a metallic conductive reflective coating such as gold.

While not intending to be limiting on the scope of the disclosure, the following example illustrates that providing the reflective coating on the reflective steps of a grating and not on the riser can be effective in reducing polarization dependent loss.

Figure 4:
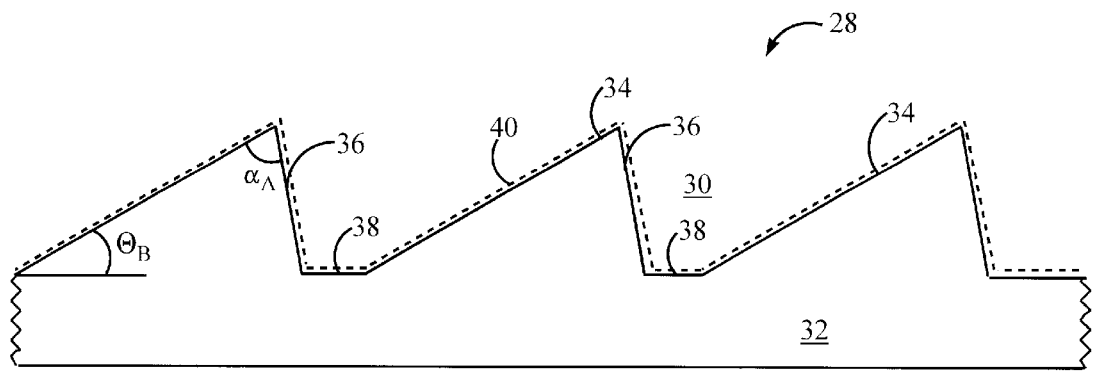
FIG. 4 is a schematic profile of the groove pattern of an exemplary diffraction grating with a reflective coating on the entire surface of the grating.

FIG. 4 is a schematic profile of groove pattern of a diffraction grating 28. The grating 28 consists of a plurality of grooves 30 formed in a substrate 32. Each groove is defined by a transverse step 34 and riser 36 that are joined in the groove trough by a flat 38. In this example, the entire surface of the grooves, including the reflective step 34, the flat 38 and the riser 36 are covered by a conductive reflective coating 40 of gold. The groove density is 171.4 grooves per millimeter, the blaze angle, $\theta_b$, is 31°, the groove depth is about 2500.0 nm, the flat 38 is about 713.0 nm long, and the apex angle, $\alpha_a$, is 80°.

Figure 5:
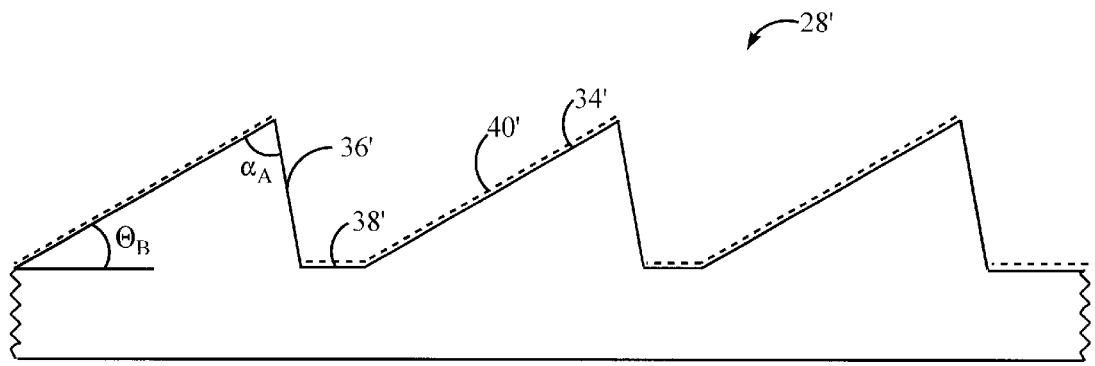
FIG. 5 is a schematic profile of the groove pattern of the diffraction grating of FIG. 4 without a reflective coating on the risers in accordance with the present invention.

FIG. 5 is a profile of the groove pattern of a diffraction grating 28' which is identical to the diffraction grating 28 in all respects except the surface of the risers 36' does not have the conductive reflective coating 40'. Thus, the reflective step and the flat 38' are the only parts of the grating surface that are coated.

Figure 6:
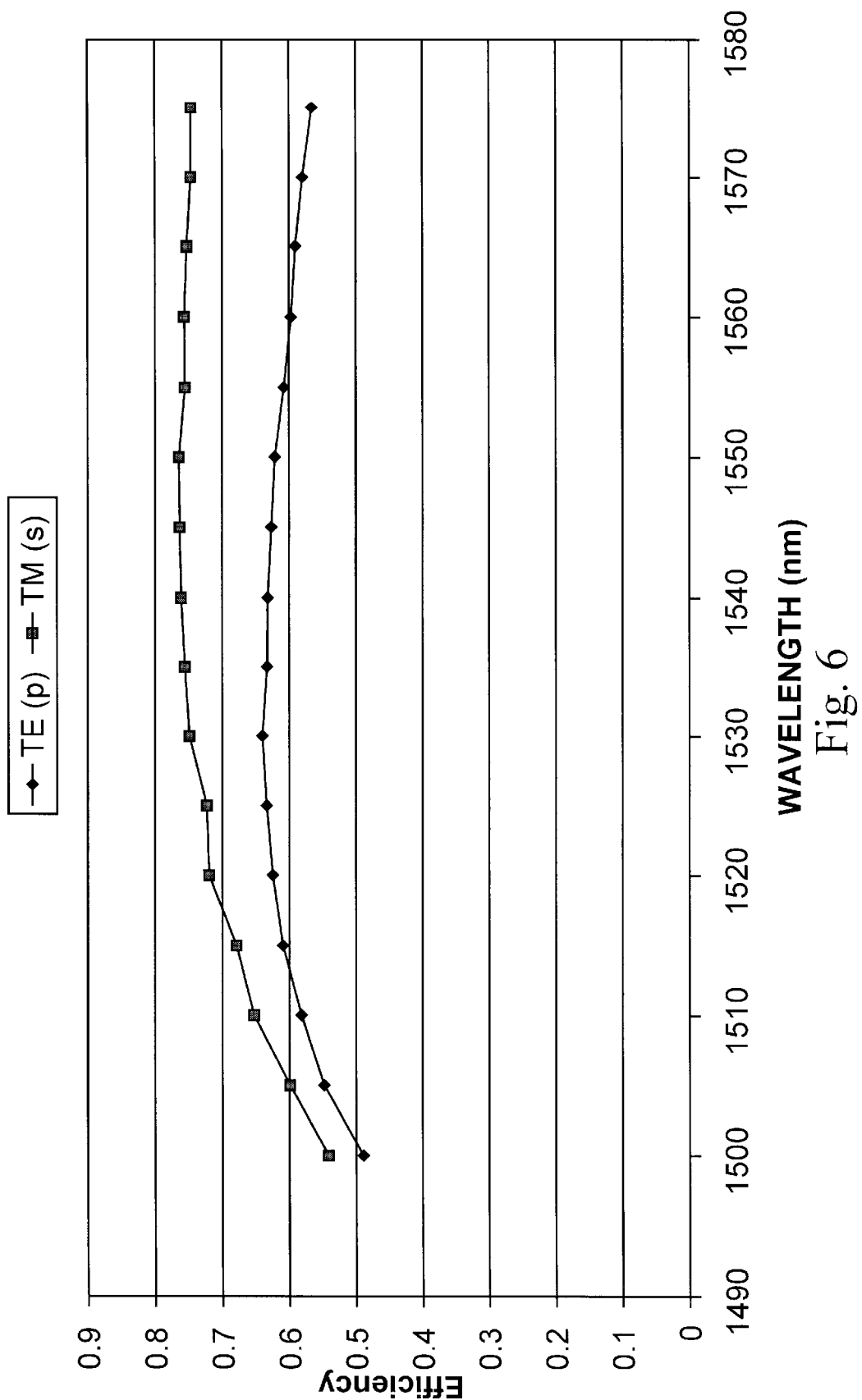
FIG. 6 a graph of diffraction efficiency varying as a function of wavelength within a select bandwidth for the TM and TE components of the refracted optical signal of the grating of FIG. 4.

FIG. 6 is a graph of efficiency versus wavelength for the TE and TM components of a refracted optical signal as a function of wavelength. The efficiency is the ratio of the energy content of the diffracted light of the respective TE and TM component and the energy content of the light incident on the grating. For the C hand of wavelengths which is currently used for optical communication ($\lambda$=1528–1565 nm) the polarization dependent loss, measured as the difference in efficiency between the TE and TM components, varies between about 10–16 percent.

Figure 7:
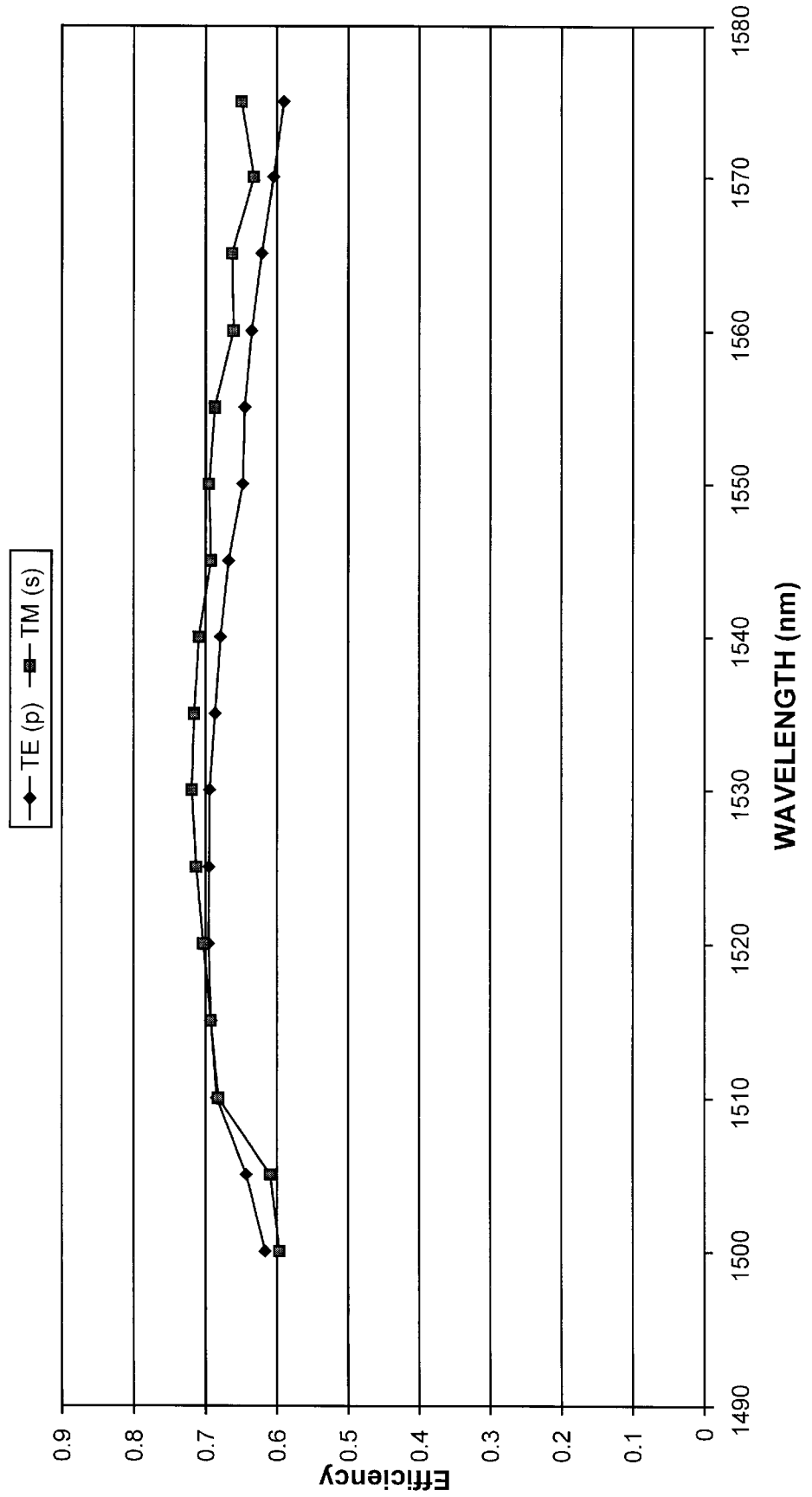
FIG. 7 is similar to the graph of FIG. 6 showing the effect of not having a reflective coating on the risers of the grating of FIG. 5.

FIG. 7 illustrates the polarization dependent loss for the grating 28' illustrated in FIG. 5 where only the reflective steps 34' are coated. Here the polarization dependent loss is sharply reduced, varying between about 2.5–5 percent.

Not providing a reflective coating on the riser of a grating in accordance with the present invention decreases polarization dependent loss inherent in bulk diffraction gratings. It does not require alteration of the grating profile which could detrimentally effect the ability of the grating to provide necessary channel separation, resolution and efficiency. Furthermore, these advantages can be provided to known grating profiles with minimal effort and expense.

What is claimed is:

1. A diffraction grating for use in multiplexing and demultiplexing optical signals in optical communications systems, the diffraction grating comprising a plurality of grooves formed in a substrate with each groove having a groove surface including a reflective step surface, a riser transverse the reflective step surface and an intermediate surface defining a trough bottom between the reflective step and riser, the reflective step surfaces having a reflective coating and the transverse riser not having a reflective coating.

2. The diffraction grating of claim 1 wherein the reflective coating comprises an electrically conductive coating.

3. The diffraction grating of claim 1 wherein the reflective coating is metallic.

4. The diffraction grating of claim 1 wherein the reflective coating comprises gold.

5. The diffraction grating of claim 1 wherein at least a portion of the intermediate surface has a reflective coating.

6. A diffraction grating for use in multiplexing and demultiplexing optical signals in an optical communication system, the diffraction grating comprising a plurality of parallel grooves formed in a substrate, each groove having a planar reflective step surface, a riser transverse the reflective step surface flat between the reflective step and riser, the reflective step surfaces having a reflective coating and the risers not having a reflective coating.

7. The diffraction grating of claim 6 wherein the reflective coating is metallic.

8. The diffraction grating of claim 6 wherein at least a portion of the flat has a reflective coating.

9. A method of making a reflective diffraction grating for diffracting optical signals in an optical communication system, the method comprising:
   a) forming a plurality of parallel grooves in a substrate, the parallel grooves comprising a step, a riser and a flat therebetween; and
   b) providing a reflective coating on the step and not on the risers.

10. The method of claim 9 wherein step b) is performed by ion beam sputtering.

11. The method of claim 9 wherein step b) is performed by first coating the steps and risers with a reflective coating and then etching the coating from the risers.

12. The method of claim 9 wherein the reflective coating comprises an electrically conductive reflective coating.

13. The method of claim 9 further comprising providing the reflective coating on at least a part of the flat.

14. A diffraction grating for minimizing polarization dependent loss of a defense wavelength division (de) multiplexer used in optical communication over a select wavelength band, the diffraction grating comprising a plurality of grooves each having a reflective step surface having a blaze angle greater than 30° and a riser transverse the reflective step surface, the reflective surface having a coating reflecting all incident wavelength of light of the select wavelength band and the riser not having a reflective coating.

15. The diffraction of claim 14 further comprising an intermediate surface defining a trough between the reflective step and transverse riser.

16. The diffraction grating of claim 15 wherein at least a portion of the intermediate surface has a reflective coating.

17. The diffraction grating of claim 14 further comprising an apex angle between a reflective surface and a transverse riser of adjacent grooves, the apex angle being less than 90°.

* * * * *